United States Patent [19]
Palladino

[11] 3,799,736
[45] Mar. 26, 1974

[54] APPARATUS AND METHOD FOR BROWNING AND BAKING PIES

[75] Inventor: Frank A. Palladino, Pottstown, Pa.

[73] Assignee: N. Palladino & Bros., Pottstown, Pa.

[22] Filed: May 5, 1972

[21] Appl. No.: 250,571

[52] U.S. Cl............................ 432/124, 198/33 AB
[51] Int. Cl.............................................. F27b 9/14
[58] Field of Search........ 107/57 R, 57 A, 57 D, 56; 221/253; 198/33 AB; 432/121, 124

[56] References Cited
UNITED STATES PATENTS

| | | | |
|---|---|---|---|
| 3,440,975 | 4/1969 | Beuker............................ | 107/55 B |
| 3,047,123 | 7/1962 | McKay........................... | 198/33 AB |
| 3,382,824 | 5/1968 | Bronfman..................... | 198/33 AB X |
| 3,189,158 | 6/1965 | Lucas............................. | 198/33 AB |
| 3,347,182 | 10/1967 | Royer.............................. | 107/57 B |
| 3,272,155 | 9/1966 | Royer............................. | 107/55 B |

Primary Examiner—John J. Camby
Attorney, Agent, or Firm—Paul & Paul

[57] ABSTRACT

An oven for browning and baking pies, having a two chain conveyor for transporting pies through the oven, one chain geared to move slightly faster than the other to impart continuous rotation to the pies, with a pair of burners positioned above the path of the pies and arranged to direct their heat downwardly on opposite edge portions of the pies, such that as the pies are rotated all portions thereof are heated uniformly. A third burner is placed under the conveyor chains for use in baking operations. The oven preferably comprises a plurality of zones, each containing a conveyor and burners, the zones being formed by hollow partitions therebetween through which air and moisture are exhausted, the hollow partitions acting to insulate each zone from adjacent zones.

10 Claims, 4 Drawing Figures

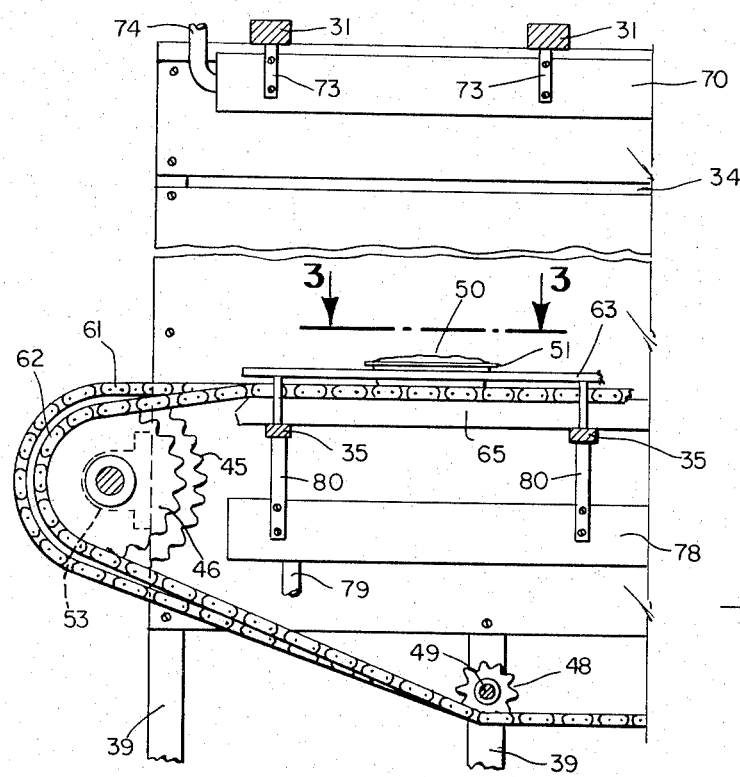
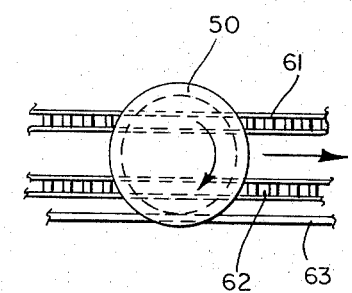
Fig. 3
Fig. 2
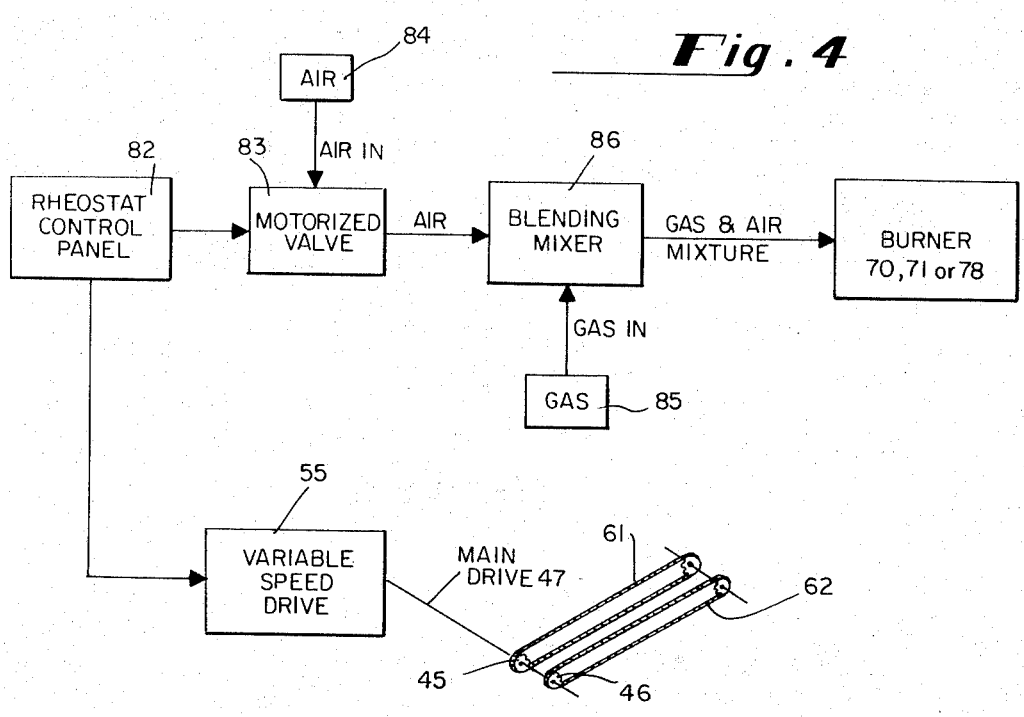
Fig. 4

APPARATUS AND METHOD FOR BROWNING AND BAKING PIES

BACKGROUND OF THE INVENTION

A. Field of the Invention

This invention lies in the field of browning and baking ovens and methods of browning and baking pies and, more particularly, ovens adapted to both brown and bake pies and similar bakery items.

B. Description of the Prior Art

The commercial baking industry, and the pie baking industry in particular, has long had a need for an oven which serves the dual functions of baking and browning, and particularly browning pies so that they come out with an aesthetically pleasing golden brown appearance. The problem is that an oven which is designed for optimum baking conditions is generally not optimally designed for the browning function. This is a critical shortcoming, due to the substantial commercial value in producing an appealingly browned pie. Additionally, meringue topped pies are a special problem, since the meringue must be browned while desirably leaving the tips snow white.

One solution to the above problems is to in effect construct two ovens by making the oven adaptable for the two different operations. Thus, an oven with burners in fixed position may have two cooking levels, one for baking and one for browning. Alternately, the positions of the burners within the oven may be moved for the different operations, although this would be a relatively undesirable form of oven since it would be difficult to properly adjust the burners each time. In most prior art ovens, where the pies are transported through the oven from an input to an output, the pies are heated under a single row of burners which continuously supplies heat directed at the pies as they progress through the oven. This embodiment has the deficiency of requiring a very intense heat from the single burner, such that the heat output of the burner must be very closely and critically adjusted. Even with such critical adjustment, the heat transmission from a single burner is necessarily non-uniform with respect to all portions of the pie, such that there is non-uniform baking and/or browning of the pie as it passes through the oven. Generally, since the heat must be directed substantially at the center of the pie, the center is overcooked and the edges are relatively undercooked. Further, this arrangement and operation generally results in a very hot pie at the output of the oven, such that in many pie browning operations the pies must be stored for a substantial period of time after being taken from the oven. Indeed, in many commercial arrangements the pies are browned at 450°F for 12 minutes, and are so hot at the end of the browning period that they are transported over cooling conveyors or through chilling boxes in order to cool them to a temperature at which they can be packed.

From the above it is seen that there is a great need in the art for a browning and baking oven which is adapted to brown and bake more uniformly and in less time, to provide a superior product, and also to provide increased browning and baking capacity. Such an oven would not only produce a superior product, but would enable the elimination of presently required cooling facilities and would effect a savings in required personnel for carrying out the browning and baking processes. An oven designed such that both browning and baking are carried on at the same level within the oven would provide for more economical use of the equipment as well as increased uniformity of the product.

SUMMARY OF THE INVENTION

It is an object of this invention to provide a method for browning and baking pies, and similar pastry items, and an oven for carrying out such method, which enables browning and baking which is quicker, more efficient and more economical than available in the prior art.

It is a further object of this invention to provide a method for browning pies whereby all portions of the pie are browned uniformly.

It is another object of this invention to provide a browning and baking oven wherein both browning and baking operations are carried on without changing the relative position of the pies within the oven.

It is another object of this invention to provide an oven system for browning and baking pies quickly and inexpensively, and for providing a browned pie which does not need to be cooled after the browning operation.

It is another object of this invention to provide an oven wherein pies can be both browned and baked on the same elevation, and wherein the pies are rotated while being browned and baked so that all portions of the pie are heated uniformly.

In accordance with the above objects, there is provided a multi-zone baking oven, each zone having transport means for conveying a plurality of pies therethrough, said transport means causing rotation of each pie about its axis as it is transported, a pair of substantially continuous burners located at a constant height above said transport means, each of said burners adapted to direct heat downwardly toward opposite edge portions of each pie such that all portions of the pie receive substantially equal amounts of heat as the pie is rotated and transported; and a third burner located under the transport means for use in baking pies and other bakery items. The zones are formed by hollow partitions between adjacent transporting conveyors, the partitions being connected at the top to air blower means for exhausting air out of each zone, the air passage through the partitions causing each partition to act as an insulator between adjacent zones.

BRIEF DESCRIPTION OF THE DRAWINGS

FIG. 2 is a sectional view taken along lines 2—2 of FIG. 1, and illustrating the means for driving a two chain conveyor from a common drive, with one of the chains being driven at a slightly faster speed relative to the other.

FIG. 3 is a plan view taken along line 3—3 of FIG. 2, illustrating the manner in which a pie transported by the two chain conveyor is rotated about its axis as it is transported through the oven.

FIG. 4 is a block diagram illustrating control apparatus used in the oven of this invention.

DESCRIPTION OF THE PREFERRED EMBODIMENT

Figure 1:
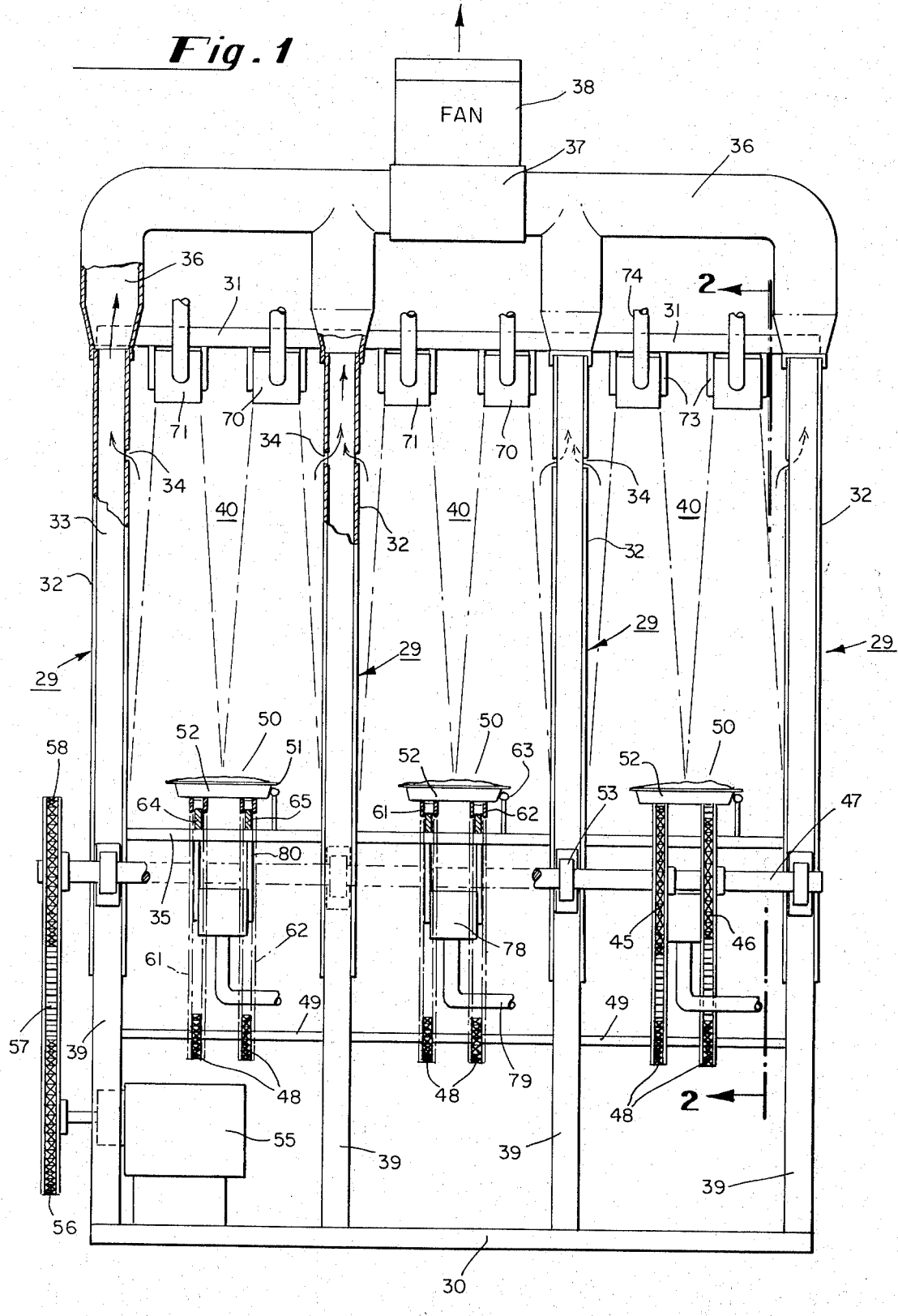
FIG. 1 is a front elevation view of an oven according to this invention, and having three zones.

Referring now to FIG. 1, there is seen a front elevation view looking longitudinally through the oven of this invention. It is to be understood that, from the perspective of FIG. 1, the pies 50 which are illustrated move normal to and into the drawing as they are transported longitudinally through the oven. While the drawing illustrates three separate zones 40, it is further understood that any number of such zones may be utilized, as is clear from the description hereinbelow.

The frame of the oven is constructed upon a lower floor member 30, to which are integrally attached vertical partitions 29, composed of upper hollow partitions 32 supported on partition supports 39. The vertical partitions 29 extend longitudinally the length of the oven, the space between the respective partitions being defined as the separate zones 40. The baking and browning operations according to the method of this invention are performed in such zones, the operating conditions within which are maintained substantially independent of adjacent zones as is discussed in greater detail hereinbelow. A plurality of upper transverse support members 31 are connected to the tops of the hollow partitions 32. Lower transverse support members 35 extend between and are connected to hollow partitions 32 at a level intermediate floor member 30 and upper transverse members 31.

Each zone is thus defined below by floor member 30, above by upper transverse members 31 (which are spaced along the length of the oven), and a pair of vertical partitions 29. Each zone is completely open at each end, and is open on the top except for transverse members 31. The two end openings provide input and output openings for the pies which are processed within the zone.

The walls of the hollow partitions 32 are suitably constructed of sheet aluminum, and contain longitudinally running exhaust slots 34 placed toward the top thereof. Hollow partitions 32 connect at the top to ducts 36, which in turn connect to longitudinal duct connector 37, on top of which is mounted an exhaust fan 38. There is thus provided an exhaust path from within each zone 40 through slots 34, ducts 36, duct connector 37 and fan 38. Operation of fan 38 provides a constant flow of air through the hollow inner portions of partitions 32, which flow of air acts as a contained air curtain and thus provides insulation of each zone 40 from adjacent zones. Also, as is discussed further hereinbelow, this method of exhausting contributes to the maintenance of controlled temperature and moisture conditions within each zone.

In each of the zones thus formed in the oven of this invention, there is provided a two chain conveyor for carrying pies 50, comprising chains 61 and 62 respectively. Chains 61 and 62 are closed loop chains, and provide moving support surfaces of equal height which extend through the entire length of the zone. Chain 61 is driven by first sprocket 45 carried by common drive shaft 47, and chain 62 is driven by second sprocket 46, also carried by drive shaft 47. Sprocket 45 is designed to have a slightly greater number of teeth than sprocket 46, such that chain 61 is driven at a slightly faster speed than chain 62. In the preferred embodiment of this invention, sprocket 45 has 48 teeth, while sprocket 46 has 45 teeth, such that chain 61 moves faster than chain 62 by a ratio of 48:45. Common drive 47 is supported by pillow blocks 53 mounted on the ends of partitions 32, and is driven by drive means comprising a variable speed motor 55, a drive sprocket 56 connected to the output shaft of motor 55, and chain 57 which connects sprocket 58 mounted on the end of shaft 47 to drive sprocket 56. Chains 61 and 62 are supported and guided by chain supports 64 and 65, mounted on lower transverse support members 35 which chain supports extend longitudinally through the length of the zone. Idler sprockets 48, mounted on transverse support rods 49 which are connected to vertical supports 39, define the lower portion of the closed loop of each chain. At the far end of each zone, being the output or exit end, are additional idler sprockets, not shown, for returning the chains in their closed paths toward the front of each zone.

Also mounted on lower transverse support members 35, and adjacent to the slower moving chain in each zone, are guard rails 63. Each rail 63 is positioned parallel to chain 62, and has an upper guide portion of a height designed to fit under the lip 51 of the pie pan or pie container 52, and in position to block lateral movement of the pie in a direction from the faster moving chain to the slower moving chain. As illustrated in FIG. 3, the faster moving chain 61 has a component of a motion relative to the slower moving chain 62 which causes rotation of the pie in a clockwise manner (as viewed in FIG. 3). This rotation imparts a horizontal force to the pie which would otherwise carry it away from the faster moving chain, or to the right as viewed in FIG. 1. Such transverse lateral movement is prevented by the restraining action of guard rail 63, such that each pie is maintained on a straight path while it is rotated. This combination of longitudinal transportation as well as axial rotation causes the pie to follow a cycloidal-like path through the zone from input to output.

In the preferred embodiment of this invention, the zones are 32 feet long, and the relative speed of the chains causes each pie to rotate through one full revolution during its 32 foot travel. However, as will be appreciated from the discussion hereinbelow, it is required only that the pie rotate through one-quarter revolution, or 90°, in order that the process of this invention be properly carried out.

In each zone of the oven of this invention there is provided a pair of upper heaters, or burners, 70, 71, and a lower burner 78. (The terms "burner" and "heater" are used interchangeably.) Each of the upper burners 70, 71 runs longitudinally the length of the zone, the burners preferably being gas burning, infra red burners. It is noted that other types of burners may be used, within the scope of the invention. Burners 70 and 71 are connected to upper transverse support members 31 by clamps 73, such that they are fixedly held in position a fixed distance above the conveyor chains. The burners are supplied through fuel supply pipes 74, which supply a mixture of gas and air. In practice, for a 32' zone, it has been found convenient to utilize two 16' burner sections to compose each burner. The two upper burners are located at equal heights above the conveyor chains, such that they are positioned at equal heights above the pie or other object being conveyed through the zone. Additionally, the two burners are equally displaced, to left and right, of the center line of the zone which bisects the two conveyors, such that the heat radiating from each burner is directed toward an edge of the pie, i.e., the heat rays are displaced from the center of the pie. While the burners are designed to project their heat substantially straight downwardly, the heat pattern does have some divergence, as illustrated, such that each heater projects some heat toward the center of the pie. There may be some small amount of overlapping at the center of the pie, although preferably the amount of overlapping is minimal. The important feature of the arrangement of the heaters is that the two heat beams do not overlap so as to produce excessive heating in the center of the pie. By concentrating the main portion of the heat content of each beam outward from the center toward that edge of the pie which is more directly under each heater, the hottest of the infra red rays hit the edges of the pies, and cooler or less intense rays diverge toward and are absorbed by the center of the pie. In this manner, overheating of the center of the pie is avoided, while the edges of the pie receive the thrust of the infra red rays.

With the above arrangement of the two upper heaters, it is seen that were the pie to be simply transported directly through the zone, opposite edges of the pie would receive relatively intense portions of heat, and would be browned in excess of a center strip lying approximately between the two conveyor belts. To prevent this condition, the pie is rotated as described above, such that all edges of the pie, around its 360° circumference, receive substantially equal amounts of heat from the two upper burners throughout its transport through the zone. It is to be noted that, if the pie is rotated at least one quarter of a revolution, or 90°, all circumferential portions of the pie will have been exposed to the center portion of one of the heat beams. In the preferred embodiment, each pie is rotated through one full revolution while being transported longitudinally through the full 32 feet of the heating zone, the rotation being uniform with time such that all edges of the pie receive equal amounts of heat.

From the above description, it is seen that when the upper heaters are on such that each is projecting a beam of heat downwardly, each of the burners continuously directs heat on respective different edge portions of the pies passing below, without any substantial overlap of heating from the two heat beams. As the beam diverges laterally in its downward path from the burner to the pie surface, the intensity of heat in the outer portions of the beam is reduced, compared to the intensity of the heat toward the center of the beam. Thus, even with some degree of overlap at the center of the pie, the center is not exposed to excess heat, and is browned while absorbing relatively little heat. Since the center of the pie, where the greatest mass is located, is exposed to a minimal amount of heat during the browning process, the pie itself emerges from the oven in a relatively cool state. It is to be understood that the phrase "without any substantial overlap of heating" does not preclude any overlap of the two beams from the upper burners, but may comprise a situation where the beams were directed such that a small amount of overlap exists. On the other hand, each of the beams may be directed so that they are displaced more outwardly from the center of the pie, so that there is no overlap at all between the beams. In this case, a good result may be obtained so long as the separation between the beams is not so great that the center of the pie receives so little heat that it is not browned at all.

In the preferred embodiment of this invention, each zone has a lateral width of about 20 inches, as measured between the inside surfaces of opposite partitions 32. The partition walls are separated a sufficient distance such that, combined with the heat patterns projected from each burner, there is substantially no reflection from the sides of the partitions. In this manner, the heating or browning caused by the upper burners is dependent entirely upon the amount of heat projected from each, which can be precisely controlled. This arrangement is in contrast to prior art ovens where heat is reflected from the side walls, the amount of heat being variable depending upon the reflectivity of the walls, which reflectivity changes in accordance with the degree of cleanliness of the walls. Additionally, in the oven of this invention, the controlled exhaust through slots 34 maintains the desired temperature and moisture conditions within each zone.

Located below the conveyors in each zone is a lower heater 78, which is attached to lower transverse support members 35 by clamps 80. The lower heaters are supplied with a mixture of gas and air through fuel supply pipes 79. The lower heaters are preferably placed such that their upper projecting surfaces are positioned approximately 6 inches from the top of the conveyor (being the level of the bottom surface of the pie pans or containers 52). Burners 78, thus centrally placed between and below the conveyor chains, are used for baking operations, the heat being projected upwardly and absorbed by the container 52, from which it is conveyed uniformly throughout the pie or pastry object contained therein.

It has been found that an optimum height for upper heaters 70, 71 above the top of the conveyor is 31 to 33 inches. By placing the burners within this range, optimum browning conditions are obtained. For the pie browning operation, the two upper burners are throttled on full power, and the lower burner 78 is held off. For the baking operation, the lower burner 78 is throttled on full power, providing maximum heat from below, while the two upper burners 70, 71 are throttled down to their lowest output power condition. By this technique, the oven can be used, without any adjustment of conveyor height, to either bake or to brown.

In the above description of the preferred embodiment, the oven and process of this invention have been described by illustrating the browning and baking of a pie which is transported through a zone of the oven. It is noted that the apparatus and method of this invention are not limited to pies as such, but comprise pie crusts or shells as well as complete pies, and may comprise other forms of bakery products which are baked and browned in a manner similar to that carried out for pies.

Referring now to FIG. 4, a block diagram of the basic controls used with the oven of this invention is illustrated. The variable speed drive 55 is controlled by an electrical signal from a rheostat control panel 82, in a well known manner. As explained above, the output of variable speed drive 55 drives main drive 47, which in turn causes the movement of conveyor chains 61 and 62 in each zone. Furthermore, means are provided so that burners 70, 71 and 78 of each zone may be independently controlled in terms of the heat output. For each burner, a separate rheostat on control panel 82 enables the operator to control a motorized valve 83, which in turn controls the amount of air from an air source 84 which is passed to a blending mixer 86. Blending mixer 86 has connected to it a source of gas 85, the amount of gas being passed out of its output being dependent upon the air provided by valve 83.

The resulting mixture of gas and air is coupled from the mixer 86 to the particular burner 70, 71 or 78. There is thus direct rheostat control on the control panel of each burner in each zone of the oven. The oven may have any number of zones, and thus would have three rheostat controls for the three different burners of each zone.

From the above it is seen that the oven of this invention provides the capability of continuously browning or baking a plurality of pies in each of a plurality of zones. In each zone, the temperature conditions are controlled and maintained independently of the adjacent zones, due to the insulating properties of the hollow partitions. By drawing air within the heating zone through the slots 34, and by adjusting the heat output of each heater, the temperature and moisture conditions in each zone are controlled independently. Further, it has been found that, by placing a pair of upper burners within the range of 31–33 inches above each pair of conveyors, and by placing a single lower heater between and below the pair of conveyor chains, the oven is adaptable to either heating or baking pies and similar objects without any mechanical adjustment, and particularly without adjusting the height or position of the pies with respect to the burners. In the browning operation, heat is continuously directed at opposite edge portions of the pie, while the pie is simultaneously and continuously rotated, such that all outer portions of the pie receive substantially uniform amounts of heat along with the inner portion of the pie, while the inner portion is not caused to receive excess heat. In this manner, the amount of heat required for the browning operation is minimal, such that browning is achieved with very little heat retention in the pie. This resulting small amount of heat retention obviates the step of cooling the pies after the browning operation, so that they may be immediately packed.

In the operation of a specific oven according to this invention, wherein each zone is 32 feet long, and using the infra red heating arrangement as described above, it takes approximately 1½ minutes to brown a meringue, as opposed to 12 minutes for the typical prior art oven; approximately 4 minutes to bake a pie shell as opposed to approximately 16 minutes for the prior art ovens; approximately 4 minutes to bake a graham cracker crust as opposed to 12 minutes for the prior art; and approximately 6½ minutes to bake a regular pastry shell as opposed to 16 to 20 minutes for the prior art. Furthermore, at the conclusion of the browning process of this invention, the pies are sufficiently cool that they may be immediately handled and packaged, as opposed to the prior art where elaborate and expensive cooling apparatus are employed in order to cool the browned pies to a point where they can be packaged. The apparatus of this invention thus provides a considerable savings in overall expense for the user.

I claim:

1. An oven, adapted for baking and browning pies, comprising:
    a. support and transport means for carrying said pies through said oven while continuously rotating said pies, said transport means defining a path of movement of said pies through the oven;
    b. a pair of spaced burners fixed in position above said path, each said burner adapted to direct its heat so as to be primarily absorbed by said pies at respective edge portions thereof; and
    c. the path and rotation of said pies relative to said burners being arranged such that said burners continuously direct heat on respective different edge portions of said pies without any substantial overlap of heating, and such that all exposed areas of each of said pies are heated uniformly during movement through said oven.

2. The oven as described in claim 1, wherein said transport means carries said item along a substantially linear path while concurrently rotating same, such that said item is carried through a cycloidal-like path.

3. The apparatus as described in claim 2, wherein said transport means comprises first and second conveyor elements arranged along said path such that each supports said pies, common drive means, first engaging means driven by said common drive means to drive said first conveyor element at a first speed, second engaging means driven by said common drive means to drive said second conveyor element at a second and faster speed, and guide means adjacent to said first conveyor, said two conveyor elements and said guide means cooperating to rotate said item while confining it on said two elements, such that it is continuously rotated as it is transported along said path.

4. The apparatus as described in claim 1, wherein said burners are infra red burners, each of said burners supplying heat continuously along said path.

5. An oven, adapted for either baking or browning pies, comprising:
    a. support and transport means for carrying said pies through said oven while continuously rotating said pies, said transport means defining a path of movement of said pies through the oven;
    b. a pair of spaced burners fixed in position within the range of 31 to 33 inches above said path, each said burner adapted to direct its heat so as to be primarily absorbed by said pies at respective edge portions thereof;
    c. the path and rotation of said pies relative to said burners being arranged such that said burners continuously direct heat on respective different edge portions of said pies without any substantial overlap of heating, and such that all exposed areas of each of said pies are heated substantially uniformly during movement through said oven;
    d. a lower burner positioned below said support and transport means; and
    e. burner control means for controlling the heat output of said spaced burners and said lower burner, so that said oven is adaptable to brown pies when said spaced burners are controlled to produce substantially full heat, and to bake pies when said lower burner is controlled to produce substantially full heat and said spaced burners are controlled to produce low heat.

6. An oven, adapted for baking and browning pies, comprising:
    a. support and transport means for carrying said pies through said oven while continuously rotating said pies, said transport means defining a path of movement of said pies through the oven;
    b. a pair of spaced burners fixed in position above said path, each said burner adapted to direct its heat so as to be primarily absorbed by said pies at respective edge portions thereof;
    c. the path and rotation of said pies relative to said burners being arranged such that said burners continuously direct heat on respective different edge portions of said pies without any substantial overlap of heating, and such that all exposed areas of each of said pies are heated uniformly during movement through said oven;

d. a vertical partition positioned continuously along each side of said path, said partitions defining a baking zone through which said item is transported by said transport means, each said partition being hollow to passage of air therethrough and having a substantially continuous generally horizontal opening located above said conveyor elements and below said burners; and e. air blower means connected to the top of said partitions for exhausting air out of said zone, such that the air within said zone is maintained substantially of uniform temperature and moisture.

7. The apparatus as described in claim 6, wherein said burners are positioned within a range of 31 to 33 inches above said path, and said burners focus their heat output downward such that no substantial portion of the heat absorbed by said pies is reflected from said partitions.

8. The apparatus as described in claim 7, comprising a substantially continuous lower burner located below said support and transport means.

9. The apparatus as described in claim 8, comprising first burner controls for controlling the heat output of said pair of burners, and second burner controls for controlling the heat output of said lower burner, such that the oven may be adapted to brown pies by providing substantially full heat from said pair of burners and no heat from said lower burner, and to bake pies by providing low heat from said pair of burners and substantially full heat from said lower burner.

10. The apparatus as described in claim 6, comprising a plurality of adjacent zones, each zone having a common one of said partitions with each adjacent zone, said partitions having the property of insulating each zone from the environment of each adjacent zone.

* * * * *